(12) United States Patent
Song (10) Patent No.: US 12,103,369 B2
(45) Date of Patent: Oct. 1, 2024

(54) SLIDING DOOR MOUNTING REINFORCEMENT STRUCTURE AND VEHICLE BODY PROVIDED WITH THE SAME

(71) Applicants: HYUNDAI MOTOR COMPANY, Seoul (KR); KIA CORPORATION, Seoul (KR)

(72) Inventor: Won Ki Song, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 204 days.

(21) Appl. No.: 17/859,695

(22) Filed: Jul. 7, 2022

(65) Prior Publication Data
US 2023/0182549 A1    Jun. 15, 2023

(30) Foreign Application Priority Data
Dec. 15, 2021    (KR) .................... 10-2021-0179621

(51) Int. Cl.
*B62D 25/06* (2006.01)
*B60J 5/06* (2006.01)

(52) U.S. Cl.
CPC ............... *B60J 5/06* (2013.01); *B62D 25/06* (2013.01)

(58) Field of Classification Search
CPC ........ B62D 25/00; B62D 25/02; B62D 25/04; B62D 25/06
USPC ......... 296/155, 203.03, 203.01, 210, 29, 39, 296/187.12, 193.06
See application file for complete search history.

(56) References Cited

U.S. PATENT DOCUMENTS 9,718,497 B2 *    8/2017    Nakayama ........... B62D 27/023

FOREIGN PATENT DOCUMENTS

JP             6187537 B2 *    8/2017 ............ B62D 25/04
JP          2021014218 A  *    2/2021

OTHER PUBLICATIONS

Text JP17859695 (Year: 2017).*
Text JP6187537 (Year: 2021).*

* cited by examiner

*Primary Examiner* — Dennis H Pedder
(74) *Attorney, Agent, or Firm* — MCDONNELL BOEHNEN HULBERT & BERGHOFF LLP (57) ABSTRACT

A sliding door mounting reinforcement structure includes a roof rail side lower member mounted in the length direction of the vehicle body and having a lower member flange formed thereon, and a roof rail center member mounted in the width direction of the vehicle body and coupled with the lower member flange.

12 Claims, 7 Drawing Sheets

SLIDING DOOR MOUNTING REINFORCEMENT STRUCTURE AND VEHICLE BODY PROVIDED WITH THE SAME

CROSS REFERENCE TO RELATED APPLICATIONS

This application claims priority to and the benefit of Korean Patent Application No. 10-2021-0179621 filed in the Korean Intellectual Property Office on Dec. 15, 2021, the entire contents of which are incorporated herein by reference.

BACKGROUND

(a) Field

The present disclosure relates to a vehicle body reinforcement structure. More particularly, the present disclosure relates to a sliding door mounting reinforcement structure and a vehicle body provided with the same capable of uniformizing the side strength of the vehicle body.

(b) Description of the Related Art

Recently, the vehicle industry is introducing a new concept of future mobility vision for realizing a human-centered and dynamic future city. One of these future mobility solutions is a PBV (Purpose Built Vehicle) as a purpose-based mobility.

PBV is an electric vehicle-based (EV) environment-friendly vehicle that provides a variety of customized services to users. The vehicle body of this PBV includes an under body (also called a rolling chassis or skateboard in the industry) and an upper body assembled to the under body.

Here, the upper body may be configured in various forms according to the type of customized service of the PBV. For example, the PBV has only one door in front of the vehicle, and the door is not applied to the passenger seat, so that the vehicle body can be configured more economically.

However, if the door is not applied to the passenger seat and a door, for example, a sliding door, is applied to the rear of the passenger seat, a difference in vehicle body strength between the part to which the sliding door is applied and the side of the passenger seat position may occur.

This local strength difference of the vehicle body may exacerbate the breakage and buckling phenomenon of the sliding door part, which has relatively weak strength during a side impact of the vehicle.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a sliding door mounting reinforcement structure and a vehicle body provided with the same capable of uniform vehicle body strength A sliding door mounting reinforcement structure according to an exemplary embodiment of the present disclosure may include a roof rail side lower member mounted in the length direction of the vehicle body and having a lower member flange formed thereon, and a roof rail center member mounted in the width direction of the vehicle body and coupled with the lower member flange.

The sliding door mounting reinforcement structure according to an exemplary embodiment of the present disclosure may further include a roof rail side upper member which forms a sliding upper reinforcement together with the roof rail side lower member and of which an upper member upper surface coupled with the roof rail center member is formed thereon.

The sliding door mounting reinforcement structure according to an exemplary embodiment of the present disclosure may further include an upper guide rail mounted on the sliding upper reinforcement to guide the movement of a sliding upper roller.

The roof rail side upper member may further include an upper member protrude portion formed protrude from the upper member upper surface in the direction of the upper guide rail.

The sliding upper reinforcement may include a main body on which the upper guide rail is mounted thereon, and an extension portion extending in the closing direction of the sliding door along the length direction of the vehicle body.

The extension portion may extend toward the roof rail center member in the width direction of the vehicle body.

The sliding door mounting reinforcement structure according to an exemplary embodiment of the present disclosure may further include a center pillar coupled to the roof rail center member and mounted in height direction of the vehicle body.

The roof rail side lower member, the roof rail side upper member and the roof rail center member may be combined to form a center closed cross-section therein.

An overlapping portion of the roof rail side lower member, the roof rail side upper member and the roof rail center member may be welded.

The center pillar may include a center pillar inner portion disposed adjacent to the center closed cross-section, and a center pillar outer portion connected with the center pillar inner portion to form a pillar closed cross-section therein.

The center pillar inner portion may further include a center pillar inner flange welded with the roof rail center member and the roof rail side upper member.

The center pillar inner portion may further include a side lower welding portion for welding with the roof rail side lower member.

The roof rail side upper member may include a side upper member flange extending in the width of the vehicle body and downwardly so as to be welded with the center pillar outer portion.

The sliding door mounting reinforcement structure according to an exemplary embodiment of the present disclosure may further include a rail mounting bracket for mounting the upper guide rail to the sliding upper reinforcement.

A door-less vehicle body of which the sliding door mounting reinforcement structure according to an exemplary embodiment of the present disclosure may be applied, and there may be no door in front of the sliding door mounting reinforcement structure.

According to an exemplary embodiment of the present disclosure, the sliding door mounting reinforcement structure and the vehicle body provided with the same may make the vehicle body strength uniform, thereby enhancing the side impact performance of the vehicle body.

Particularly, the sliding door mounting reinforcement structure and the vehicle body provided with the same according to an exemplary embodiment of the present disclosure may be applied to the doorless vehicle body without a door in front of the sliding door, it is possible to reduce the local strength difference of the vehicle body.

In addition, the effects that can be obtained or predicted by an exemplary embodiment of the present disclosure will be disclosed directly or implicitly in the detailed description of an exemplary embodiment of the present disclosure. That is, various effects predicted according to an exemplary embodiment of the present disclosure will be disclosed within a detailed description to be described later.

BRIEF DESCRIPTION OF THE FIGURES

Since these drawings are for reference in explaining an exemplary embodiment of the present disclosure, the technical idea of the present disclosure should not be construed as being limited to the accompanying drawings.

DETAILED DESCRIPTION

The present disclosure will be described more fully hereinafter with reference to the accompanying drawings, in which exemplary embodiments of the disclosure are shown.

As those skilled in the art would realize, the described embodiments may be modified in various different ways, all without departing from the spirit or scope of the present disclosure.

In order to clearly explain the present disclosure, parts irrelevant to the description are omitted, and the same reference numerals are assigned to the same or similar elements throughout the specification.

Since the size and thickness of each component shown in the drawing are arbitrarily indicated for convenience of explanation, the present disclosure is not necessarily limited to the one shown in the drawing, and the thickness is enlarged to clearly express various parts and areas.

In addition, in the detailed description below, the reason that the names of the components are divided into first, second, etc. is to classify the components in the same relationship, and it is not necessarily limited to the order in the following description.

Throughout the specification, when it is said that a certain part includes certain constituent elements, this means that other constituent elements may be further included, rather than excluding other constituent elements, unless specifically stated otherwise.

In addition, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

An exemplary embodiment of the present disclosure will hereinafter be described in detail with reference to the accompanying drawings.

Figure 1:
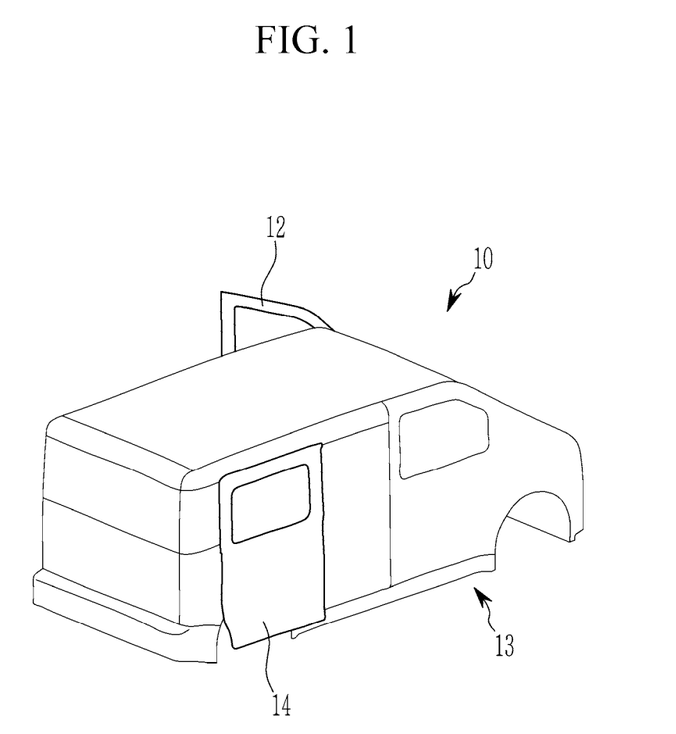
FIG. 1 is an external perspective view of a vehicle body to which a sliding door mounting reinforcement structure according to an exemplary embodiment of the present disclosure may be applied.

FIG. 1 is an external perspective view of a vehicle body to which a sliding door mounting reinforcement structure according to an exemplary embodiment of the present disclosure may be applied.

Referring to FIG. 1, a vehicle body 10 to which a sliding door mounting reinforcement structure according to an exemplary embodiment of the present disclosure may be applied includes a front door 12 and a sliding door 14 that is mounted in the opposite direction in which the front door 12 is mounted.

The vehicle body 10 may be a doorless vehicle body 10 without a door of the front passenger seat 13 in front of the sliding door 14.

The front passenger seat 13 has relatively high strength because there is no door, but the mount position of the sliding door 14 has relatively low strength.

Therefore, the difference in strength between the side of the passenger seat 13 and the sliding door 14 is large, so that the damage of the sliding door 14 occurs relatively large during a side collision of the vehicle, which may be a risk to the safety of the occupant.

Figure 2:
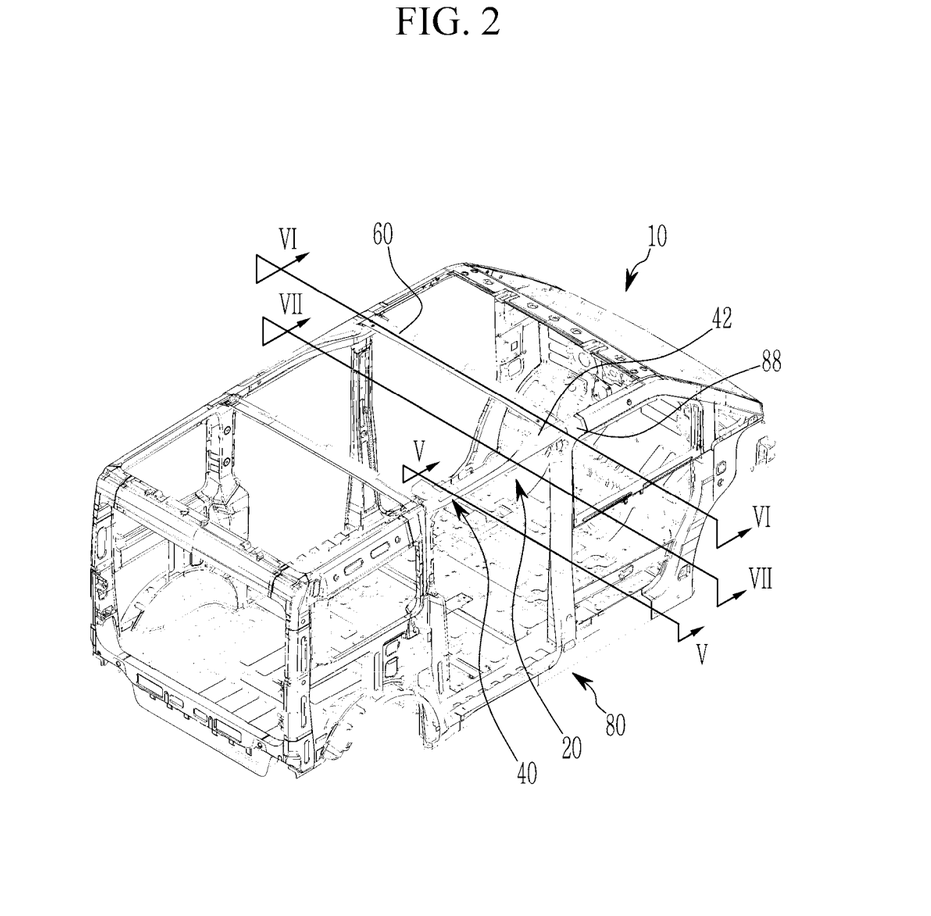
FIG. 2 is an internal perspective view of a vehicle body to which a sliding door mounting reinforcement structure according to an exemplary embodiment of the present disclosure may be applied.
Figure 3:
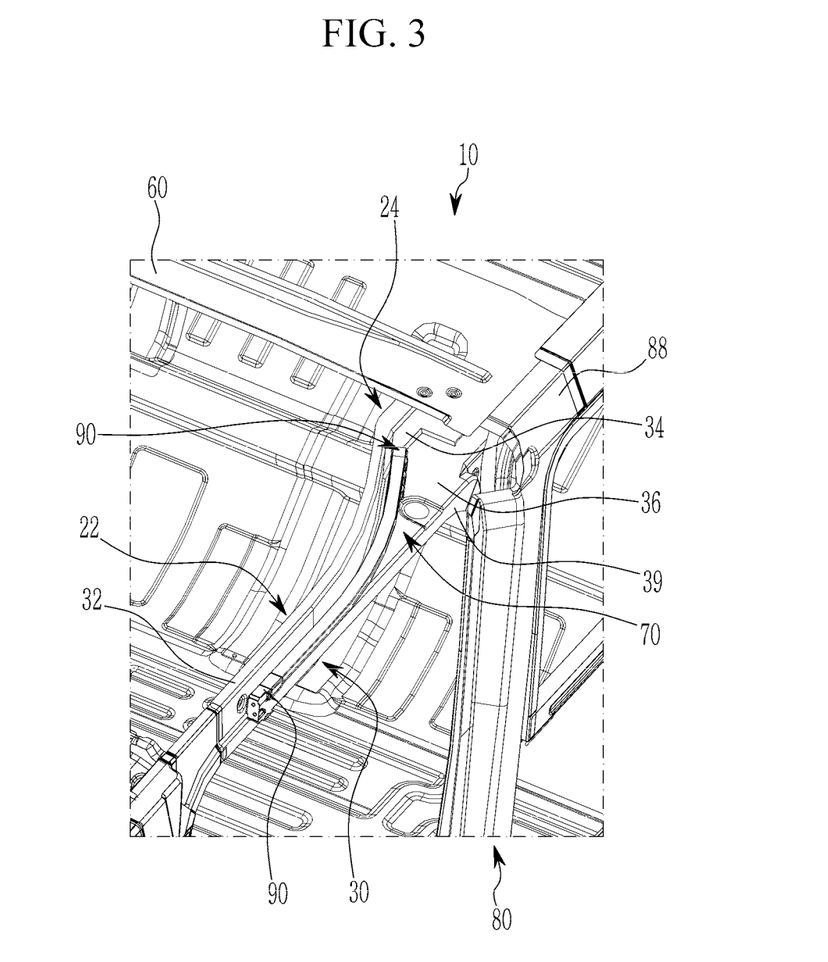
FIG. 3 is a partial perspective view of a sliding door mounting reinforcement structure according to an exemplary embodiment of the present disclosure.

FIG. 2 is an internal perspective view of a vehicle body to which a sliding door mounting reinforcement structure according to an exemplary embodiment of the present disclosure may be applied, and FIG. 3 is a partial perspective view of a sliding door mounting reinforcement structure according to an exemplary embodiment of the present disclosure.

Figure 4:
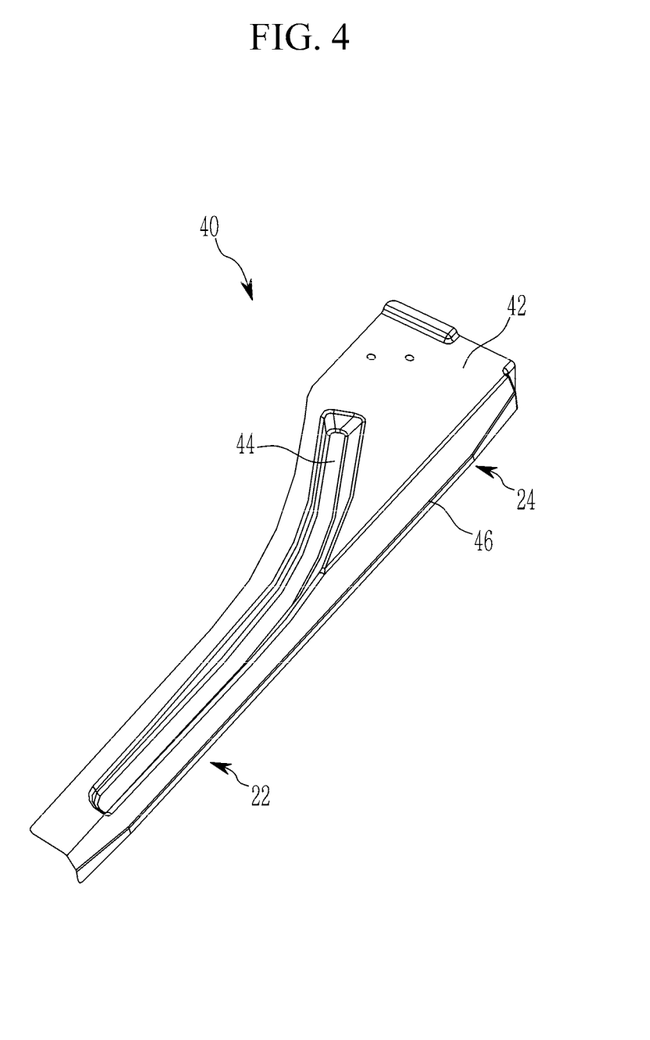
FIG. 4 is a perspective view of a roof rail side upper member of the sliding door mounting reinforcement structure according to an exemplary embodiment of the present disclosure.
Figure 5:
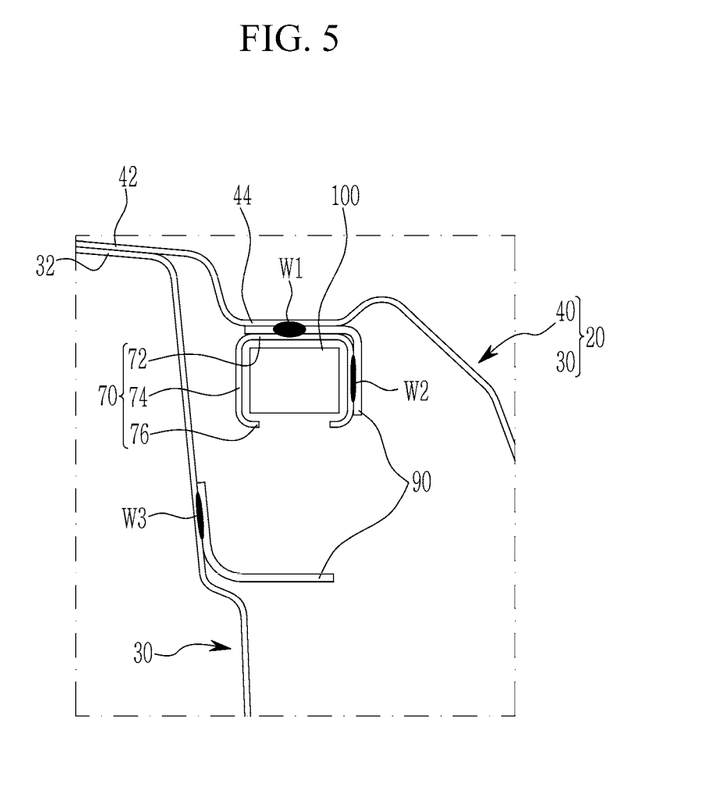
FIG. 5 is a cross-sectional view along the V-V line of FIG. 2.
Figure 6:
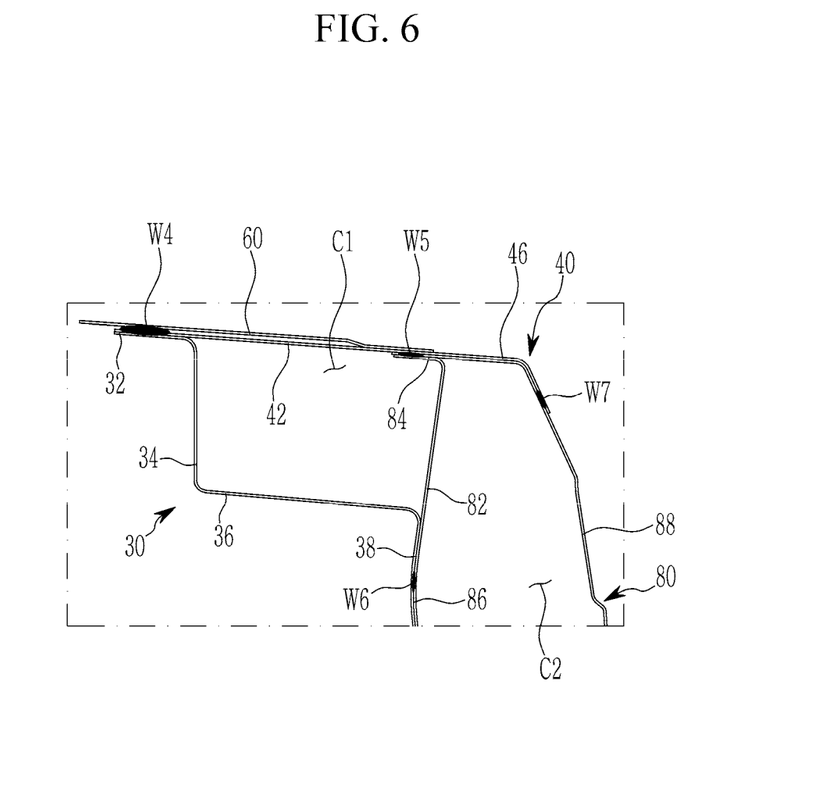
FIG. 6 is a cross-sectional view along the VI-VI line of FIG. 2.

FIG. 4 is a perspective view of a roof rail side upper member of the sliding door mounting reinforcement structure according to an exemplary embodiment of the present disclosure, FIG. 5 is a cross-sectional view along the V-V line of FIG. 2, and FIG. 6 is a cross-sectional view along the VI-VI line of FIG. 2.

Referring to FIG. 1 to FIG. 6, a sliding door mounting reinforcement structure according to an exemplary embodiment of the present disclosure is configured on the upper portion of the vehicle body 10 to respond to a side collision of the vehicle body 10.

The sliding door mounting reinforcement structure according to an exemplary embodiment of the present disclosure may include a roof rail side lower member 30 mounted in the length direction of the vehicle body 10 and having a lower member flange 32 formed thereon and a roof rail center member 60 mounted in the width direction of the vehicle body 10 and coupled with the lower member flange 32.

The roof rail center member 60 mounted in the width direction of the vehicle body 10 and the roof rail side lower member 30 mounted in the length direction of the vehicle body 10 are combined to improve the side impact strength of the upper part of the vehicle body 10.

The sliding door mounting reinforcement structure according to an exemplary embodiment of the present disclosure may further include a roof rail side upper member 40 which forms a sliding upper reinforcement 20 together with the roof rail side lower member 30 and of which an upper member upper surface 42 coupled with the roof rail center member 60 is formed thereon.

In FIG. 3, the roof rail side upper member 40 is omitted.

The sliding door mounting reinforcement structure according to an exemplary embodiment of the present disclosure may further include an upper guide rail 70 mounted on the sliding upper reinforcement 20 to guide the movement of a sliding upper roller 100.

Figure 7:
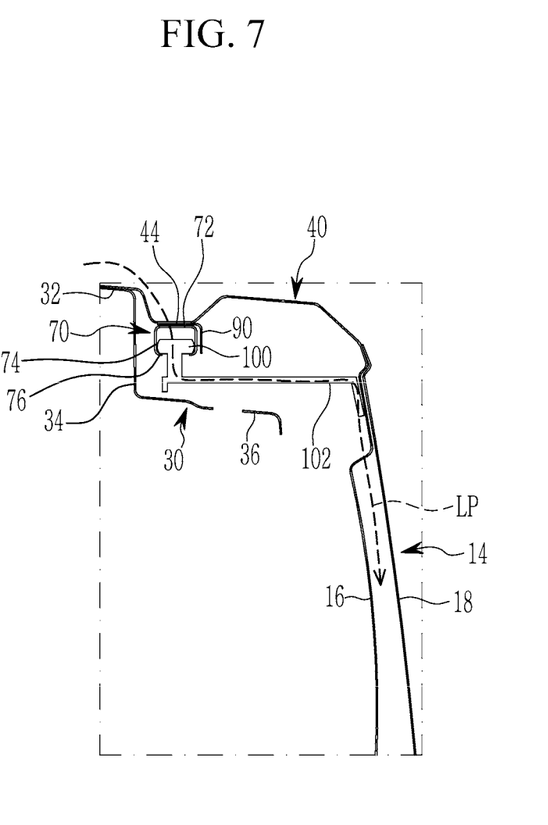
FIG. 7 is a cross-sectional view along the line VII-VII in FIG. 2.

The sliding upper roller 100 is mounted on the sliding door 14 via a roller bracket 102 (referring to FIG. 7).

The upper guide rail 70 may include a rail upper surface 72 that engages the roof rail side upper member 40, a rail side surface 74 curved on the rail upper surface 72 and a rail end surface 76 curved inward from the rail side surface 74.

That is, as shown in FIG. 5, the rail upper surface 72 mounts the upper guide rail 70 to the roof rail side upper member 40, the rail side surface 74 guides the movement of the sliding upper roller 100, and the rail end surface 76 prevents the sliding upper roller 100 from separating from the upper guide rail 70.

The roof rail side upper member 40 may further include an upper member protrude portion 44 formed protrude from the upper member upper surface 42 in the direction of the upper guide rail 70.

The upper member protrude portion 44 is formed protrude to the lower portion thereof to increase the strength of the roof rail side upper member 40, and prevent interference with the mount of the upper guide rail 70.

The sliding upper reinforcement 20 may include a main body 22 on which the upper guide rail 70 is mounted thereon and an extension portion 24 extending in the closing direction of the sliding door along the length direction of the main body 22.

The extension portion 24 may extend toward the roof rail center member 60 in the width direction of the vehicle body 10.

The sliding door mounting reinforcement structure according to an exemplary embodiment of the present disclosure may further include a center pillar 80 coupled to the roof rail center member 60 and mounted in height direction of the vehicle body 10.

The extension portion 24 is formed to extend to the center pillar 80 to increase connection strength with the center pillar 80, and is formed to extend in the width direction of the vehicle body 10 to increase connection strength with the roof rail center member 60.

Referring to FIG. 6, the roof rail side lower member 30, the roof rail side upper member 40 and the center pillar 80 may be combined to form a center closed cross-section C1 therein.

The roof rail side lower member 30 may include a first surface 34 curved downward from the lower member flange 32, a second surface 36 curved outwardly of the vehicle body 10 on the first surface 34 and a third surface 38 curved downward from the second surface 36. And the first surface 34, the second surface 36, the third surface 38, the upper member upper surface 42 and the center pillar 80 may form the center closed cross-section C1.

The center pillar 80 may include a center pillar inner portion 82 disposed adjacent to the center closed cross-section C1 and a center pillar outer portion 88 connected with the center pillar inner portion 82 to form a pillar closed cross-section C2 therein.

The center closed cross-section C1 and the pillar closed cross-section C2 are adjacent to each other to form a double closed cross-section C1, and C2, so that it is possible to increase the connection strength of the roof rail center member 60, the sliding upper reinforcement 20 and the center pillar 80.

The sliding door mounting reinforcement structure according to an exemplary embodiment of the present disclosure may further include a rail mounting bracket 90 for mounting the upper guide rail 70 to the sliding upper reinforcement 20.

Referring to FIG. 5 and FIG. 6, the upper member protrude portion 44, the rail upper surface 72 and the rail mounting bracket 90 are welded W1 in the height direction of the vehicle body 10, and the rail mounting bracket 90, the rail side surface 74 and the roof rail side lower member are welded W2 and W3 respectively in the width direction of the vehicle body 10 so as to secure the support strength of the upper guide rail 70.

In addition, an overlapping portion of the roof rail side lower member 30, the roof rail side upper member 40 and the roof rail center member 60 are welded W4 to secure bonding strength and to form the center closed cross-section C1 so that it is possible to respond to an impact load.

The center pillar inner portion 82 may further include a center pillar inner flange 84 for welding W5 with the roof rail center member 60 and the roof rail side upper member 40.

Through this, bonding strength can be secured and the center closed cross-section C1 may be formed to respond to vehicle impact load.

The center pillar inner portion 82 may further include a side lower welding portion 86 for welding W6 with the roof rail side lower member 30.

The side lower welding portion 86 may be welded W6 with the third surface 38, thereby securing the connection strength of the roof rail side lower member 30 and the center pillar 80.

The roof rail side upper member 40 may include a side upper member flange 46 extending in the width of the vehicle body 10 and downwardly so as to be welded W7 with the center pillar outer portion 88.

Through this, it is possible to secure the connection strength of the roof rail side upper member 40 and the center pillar 80.

In addition, by forming a double closed cross-section C1, and C2 through the welding points W4, W5, W6, and W7, the bonding strength of the roof rail center member 60, the sliding upper reinforcement 20 and the center pillar 80 may be increased FIG. 7 is a cross-sectional view along the line VII-VII in FIG. 2.

In FIG. 7, reference numerals 16 and 18 are door inner panel 16 and door outer panel 18 constituting the sliding door 14, respectively.

Referring to FIG. 7, according to the sliding door mounting reinforcement structure according to an exemplary embodiment of the present disclosure, the roof rail center member 60, the sliding upper reinforcement 20, the upper guide rail 70, the sliding upper roller 100, the roller bracket 102 and the sliding door 14 form a load path LP, so that the load on the roof of the vehicle body 10 can be distributed to the sliding door 14, and the vehicle body strength against the load can be improved.

In addition, according to the sliding door mounting reinforcement structure according to an exemplary embodiment of the present disclosure, it is possible to increase the bonding strength with the roof rail center member 60 by the shape of the sliding upper reinforcement 20 and welding of the sliding upper reinforcement 20.

In addition, according to the sliding door mounting reinforcement structure according to an exemplary embodiment of the present disclosure, it is possible to increase the bonding strength with the center pillar 80 by the shape of the sliding upper reinforcement 20 and welding of the sliding upper reinforcement 20.

Therefore, even if the vehicle body to which the sliding door mounting reinforcement structure according to an exemplary embodiment of the present disclosure is applied is a doorless vehicle body without a door in front of the sliding door, the strength can be uniform, so that occupant against vehicle body side impacts is possible.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A sliding door mounting reinforcement structure comprising:
    a roof rail side lower member mounted in a length direction of a vehicle body, the roof rail side lower member including a lower member flange;
    a roof rail center member mounted in a width direction of the vehicle body and coupled to the lower member flange;
    a roof rail side upper member which forms a sliding upper reinforcement together with the roof rail side lower member, the roof rail side upper member having an upper member upper surface coupled with the roof rail center member;
    an upper guide rail mounted on the sliding upper reinforcement configured to guide the movement of a sliding upper roller, the upper guide rail having a rail upper surface welded to the sliding upper reinforcement in a height direction of the vehicle body; and
    a rail mounting bracket for mounting the upper guide rail to the sliding upper reinforcement, the rail mounting bracket being welded to the roof rail side lower member in a width direction of the vehicle body.

2. The sliding door mounting reinforcement structure of claim 1, wherein the roof rail side upper member further comprises an upper member protruding portion formed to protrude from the upper member upper surface in a direction of the upper guide rail.

3. The sliding door mounting reinforcement structure of claim 1, wherein the sliding upper reinforcement comprises:
    a main body on which the upper guide rail is mounted; and
    an extension portion extending in a closing direction of the sliding door along the length direction of the vehicle body.

4. The sliding door mounting reinforcement structure of claim 3, wherein the extension portion extends toward the roof rail center member in the width direction of the vehicle body.

5. The sliding door mounting reinforcement structure of claim 1, further comprising a center pillar coupled to the roof rail center member and mounted in a height direction of the vehicle body.

6. The sliding door mounting reinforcement structure of claim 5, wherein the roof rail side lower member, the roof rail side upper member, and the center pillar are combined to form a center closed cross-section.

7. The sliding door mounting reinforcement structure of claim 6, wherein an overlapping portion of the roof rail side lower member, the roof rail side upper member, and the roof rail center member are welded.

8. The sliding door mounting reinforcement structure of claim 6, wherein the center pillar comprises:
    a center pillar inner portion disposed adjacent to the center closed cross-section; and
    a center pillar outer portion connected with the center pillar inner to form a pillar closed cross-section therein.

9. The sliding door mounting reinforcement structure of claim 8, wherein the center pillar inner portion further comprises a center pillar inner flange welded with the roof rail center member and the roof rail side upper member.

10. The sliding door mounting reinforcement structure of claim 9, wherein the center pillar inner portion further comprises a side lower welding portion for welding with the roof rail side lower member.

11. The sliding door mounting reinforcement structure of claim 8, wherein the roof rail side upper member comprises a side upper member flange extending in the width of the vehicle body and downwardly to be welded with the center pillar outer portion.

12. A door-less vehicle body of which the sliding door mounting reinforcement structure of claim 1 is applied, wherein there is no door in front of the sliding door mounting reinforcement structure.

* * * * *